US008226801B2

(12) United States Patent
Zhamu et al.

(10) Patent No.: US 8,226,801 B2
(45) Date of Patent: Jul. 24, 2012

(54) MASS PRODUCTION OF PRISTINE NANO GRAPHENE MATERIALS

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 285 days.

(21) Appl. No.: 12/460,863

(22) Filed: Jul. 27, 2009

(65) Prior Publication Data

US 2011/0017585 A1 Jan. 27, 2011

(51) Int. Cl.
*B01J 19/10* (2006.01)
*C01B 31/00* (2006.01)
(52) U.S. Cl. .......... 204/157.42; 204/157.47; 204/157.15
(58) Field of Classification Search ............. 204/157.15, 204/157.42, 157.47
See application file for complete search history.

(56) References Cited

U.S. PATENT DOCUMENTS

| | | | |
|---|---|---|---|
| 2,798,878 | A | 7/1957 | Hummers |
| 5,330,680 | A | 7/1994 | Sakawaki et al. |
| 7,071,258 | B1 | 7/2006 | Jang et al. |
| 8,114,375 | B2* | 2/2012 | Jang et al. ............ 423/448 |
| 2006/0014375 | A1* | 1/2006 | Ford et al. ............ 438/622 |
| 2008/0048152 | A1 | 2/2008 | Jang et al. |
| 2008/0063587 | A1* | 3/2008 | Strano et al. ............ 977/742 |
| 2009/0117467 | A1 | 5/2009 | Zhamu et al. |
| 2009/0235721 | A1 | 9/2009 | Robinson et al. |
| 2010/0055458 | A1* | 3/2010 | Jang et al. ............ 428/402 |
| 2010/0056819 | A1* | 3/2010 | Jang et al. ............ 556/478 |

OTHER PUBLICATIONS

Biswas et al, "A Novel Approach to Create a Highly Ordered Monolayer Film of Graphene Nanosheets at the Liquid-Liquid Interface," Nano Letters 2009, vol. 9, No. 1, pp. 167-172.*
Wang et al, "Wettability and Surface Free Energy of Graphene Films," Langmuir 2009, 25(18), pp. 11078-11081.*
Fowkes, "Dispersion Force Contributions to Surface and Interfacial Tensions, Contact Angles, and Heats of Immersion," Advances in Chemistry, vol. 43, Ch. 6, pp. 99-111, available online at http://pubs.acs.org/doi/abs/10.1021/ba-1964-0043.ch006.*
Stankovich et al, "Synthesis of graphene-based nanosheets via chemical reduction of exfoliated graphite oxide," Carbon 45 (2007) pp. 1558-1565.*
Konatham et al, "Molecular Design of Stable Graphene Nanosheets Dispersions," Nano Letters 2008, vol. 8, No. 12, pp. 4630-4641.*

(Continued)

*Primary Examiner* — Keith Hendricks
*Assistant Examiner* — Colleen M Raphael

(57) ABSTRACT

The present invention provides a method of producing pristine or non-oxidized nano graphene platelets (NGPs) that are highly conductive. The method comprises: (a) providing a pristine graphitic material comprising at least a graphite crystallite having at least a graphene plane and an edge surface; (b) dispersing multiple particles of the pristine graphitic material in a liquid medium containing therein no surfactant to produce a suspension, wherein the multiple particles in the liquid have a concentration greater than 0.1 mg/mL and the liquid medium is characterized by having a surface tension that enables wetting of the liquid on a graphene plane exhibiting a contact angle less than 90 degrees; and (c) exposing the suspension to direct ultrasonication at a sufficient energy or intensity level for a sufficient length of time to produce the NGPs. Pristine NGPs can be used as a conductive additive in transparent electrodes for solar cells or flat panel displays (e.g., to replace expensive indium-tin oxide), battery and supercapacitor electrodes, and nanocomposites for electromagnetic wave interference (EMI) shielding, static charge dissipation, and fuel cell bipolar plate applications.

28 Claims, 10 Drawing Sheets

OTHER PUBLICATIONS

Lotya et al, "Liquid Phase Production of Graphene by Exfoliation of Graphite in Surfactant/Water Solutions," J. Am. Chem. Soc. 2009, vol. 13, pp. 3611-3620, published on the Web Feb. 19, 2009.*

PCT, International Search Report and Written Opinion, International Application No. PCT/US2010/041652 (Sep. 14, 2010).

U.S. Appl. No. 11/800,728, filed May 8, 2007, A. Zhamu, et al.

C. Lee, et al., "Measurement of the Elastic Properties and Intrinsic Strength of Monolayer Graphene," Science, 321 (Jul. 2008) 385-388.

A. Balandin, et al. "Superior Thermal Conductivity of Single-Layer Graphene," Nano Lett., 8 (3) (2008) 902-907.

Bor Z. Jang and A Zhamu, "Processing of Nano Graphene Platelets (NGPs) and NGP Nanocomposites: A Review," J. Materials Sci. 43 (2008) 5092-5101.

Y. Hernandez, et al, "High Yield Production of Graphene by Liquid Phase Exfoliation of Graphite," Nature Nanotechnology, 2008, 3, 563.

G. Chen, et al. "Preparation and Characterization of Graphite Nanosheets from Ultrasonic Powdering Technique," Carbon, vol. 42, 2004, 753-759.

McAllister, M. J., et al., "Single sheet functionalized graphene by oxidation and thermal expansion of graphite," Chem. Materials 19(18), 4396-4404 (2007).

S. Stankovich, "Stable dispersions of graphitic nanoplatelets via reduction of exfoliated GO in presence of poly(sodium 4-styrenesulfonate)," J. Mater. Chem. 16, 155 (2006).

H. A. Becerril, et al., "Evaluation of Solution-Processed Reduced Graphene Oxide Films as Transparent Conductors," ACS Nano, 2 (2008) 463-470.

* cited by examiner

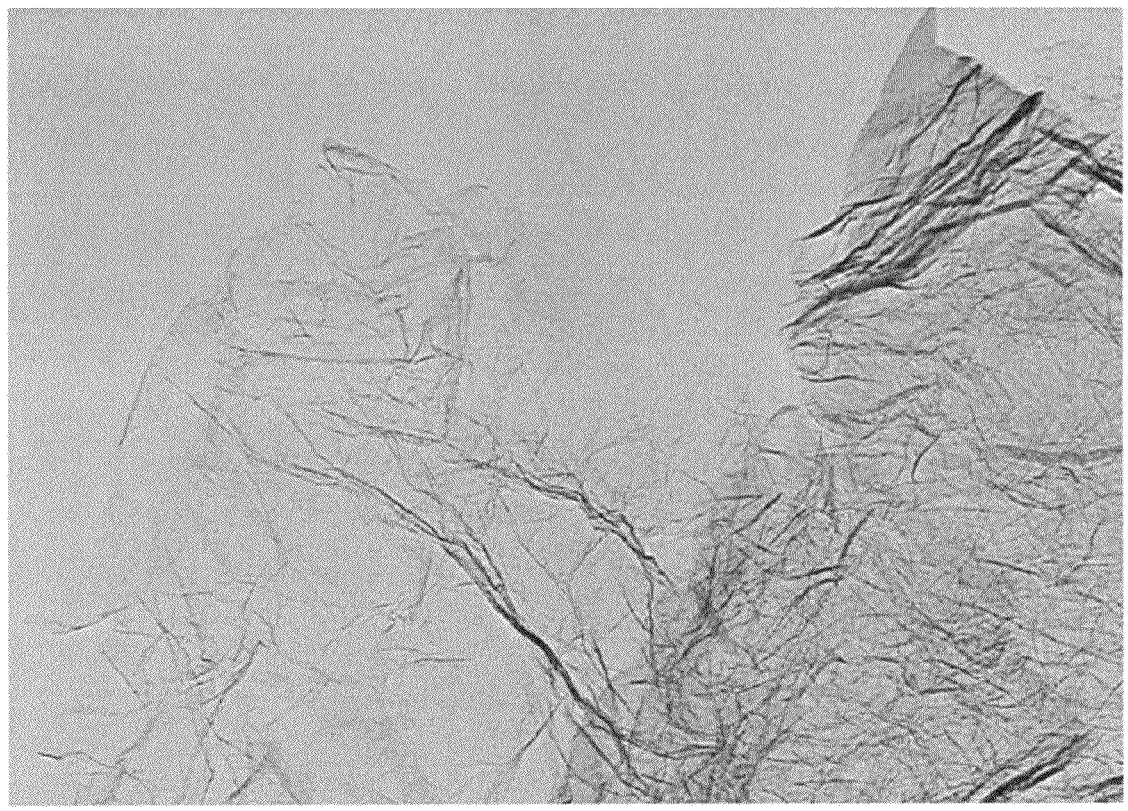
FIG. 10        100 nm

MASS PRODUCTION OF PRISTINE NANO GRAPHENE MATERIALS

The present invention is a result of a research and development project sponsored by the US National Science Foundation Small Business Technology Transfer (STTR) Program.

FIELD OF THE INVENTION

The present invention relates generally to the field of nano graphene, often referred to as nano graphene platelets (NGPs), nano graphene sheets, or nano graphene ribbons (NGRs).

BACKGROUND OF THE INVENTION

Nanocomposites containing nano-scaled fillers possess unique features and functions unavailable in conventional fiber-reinforced polymers. One major filler development in the past two decades is the carbon nanotube (CNT), which has a broad range of nanotechnology applications. However, attempts to produce CNT in large quantities have been fraught with overwhelming challenges due to poor yield and costly fabrication and purification processes. Hence, even the moderately priced multi-walled CNTs remain too expensive to be used in high volume polymer composite and other functional or structural applications. Further, for many applications, processing of nanocomposites with high CNT concentrations has been difficult due to the high melt viscosity.

Instead of trying to develop lower-cost processes for CNTs, the applicants sought to develop an alternative nanoscale carbon material with comparable properties that can be produced much more cost-effectively and in larger quantities. This development work led to the discovery of processes and compositions for a new class of nano material now commonly referred to as nano graphene platelets (NGPs), graphene nano sheets, or graphene nano ribbons [e.g., B. Z. Jang and W. C. Huang, "Nano-scaled graphene plates," U.S. Pat. No. 7,071,258, Jul. 4, 2006].

An NGP is a platelet, sheet, or ribbon composed of one or multiple layers of graphene plane, with a thickness as small as 0.34 nm (one carbon atom thick). A single-layer graphene is composed of carbon atoms forming a 2-D hexagonal lattice through strong in-plane covalent bonds. In a multi-layer NGP, several graphene planes are weakly bonded together through van der Waals forces in the thickness-direction. Multi-layer NGPs can have a thickness up to 100 nm. Conceptually, an NGP may be viewed as a flattened sheet of a carbon nano-tube (CNT), with a single-layer graphene corresponding to a single-wall CNT and a multi-layer graphene corresponding to a multi-wall CNT. However, this very difference in geometry also makes electronic structure and related physical and chemical properties very different between NGP and CNT. It is now commonly recognized in the field of nanotechnology that NGP and CNT are two different and distinct classes of materials.

NGPs are predicted to have a range of unusual physical, chemical, and mechanical properties and several unique properties have been observed. For instance, single-layer graphene (also referred to as single-sheet NGP) was found to exhibit the highest intrinsic strength and highest thermal conductivity of all existing materials [C. Lee, et al., "Measurement of the Elastic Properties and Intrinsic Strength of Monolayer Graphene," *Science*, 321 (July 2008) 385-388; A. Balandin, et al. "Superior Thermal Conductivity of Single-Layer Graphene," *Nano Lett.*, 8 (3) (2008) 902-907]. Single-sheet NGPs possess twice the specific surface areas compared with single-walled CNTs. In addition to single-layer graphene, multiple-layer graphene platelets also exhibit unique and useful behaviors. Single-layer and multiple-layer graphene are herein collectively referred to as NGPs. Graphene platelets may be oxidized to various extents during their preparation, resulting in graphite oxide or graphene oxide (GO) platelets. In the present context, NGPs refer to both "pristine graphene" containing no oxygen and "GO nano platelets" of various oxygen contents. It is helpful to herein describe how NGPs are produced.

The processes that have been used to prepare NGPs were recently reviewed by the applicants [Bor Z. Jang and A Zhamu, "Processing of Nano Graphene Platelets (NGPs) and NGP Nanocomposites: A Review," *J. Materials Sci.* 43 (2008) 5092-5101]. As illustrated in FIG. 1, the most commonly used process entails treating a natural graphite powder (referred to as Product (A) in FIG. 1) with an intercalant and an oxidant (e.g., concentrated sulfuric acid and nitric acid, respectively) to obtain a graphite intercalation compound (GIC) or, actually, graphite oxide (GO) (referred to as Product (B) in FIG. 1). Prior to intercalation or oxidation, graphite has an inter-graphene plane spacing of approximately 0.335 nm ($L_d = \frac{1}{2} d_{002} = 0.335$ nm or 3.35 Å, based on X-ray diffraction data readily available in open literature). There is a misconception in the scientific community that van der Waals forces are weak forces, which needs some qualifications. It is well-known that van der Waals forces are short range forces, but can be extremely strong in magnitude if the separation between two objects (e.g., two atoms or molecules) is very small, say <0.4 nm. However, the magnitude of van der Waals forces drops precipitously when the separation increases just slightly. Since the inter-graphene plane distance in un-intercalated and un-oxidized graphite crystal is small (<0.34 nm), the inter-graphene bonds (van der Waals forces) are actually very strong.

With an intercalation or oxidation treatment, the inter-graphene spacing is increased to a value typically greater than 0.55-0.65 nm. This is the first expansion stage experienced by the graphite material. The van der Waals forces are now significantly weakened due to the increased spacing. It is important to note that, in most cases, some of the graphene layers in a GIC are intercalated (with inter-graphene spacing increased to 0.55-0.65 nm and van der Waals forces weakened), but other layers could remain un-intercalated or incompletely intercalated (with inter-graphene spacing remaining approximately 0.34 nm and van der Waals forces staying strong).

In the conventional processes, the obtained GIC or GO, dispersed in the intercalant solution, will need to be rinsed for several cycles and then dried to obtain GIC or GO powders. These dried powders, commonly referred to as expandable graphite, are then subjected to further expansion or second expansion (often referred to as exfoliation) typically using a thermal shock exposure approach (at a temperature from 650° C. to 1,100° C.). The acid molecules residing in the inter-graphene spacing are decomposed at such a high temperature, generating volatile gas molecules that could push apart graphene planes. The inter-flake distance between two loosely connected flakes or platelets is now increased to the range of typically >20 nm to several μm (hence, very weak van der Waals forces).

Unfortunately, typically a significant portion of the gaseous molecules escape without contributing to exfoliation of graphite flakes. Further, those un-intercalated and incompletely intercalated graphite layers remain intact (still having an inter-graphene spacing of approximately <0.34 nm). Additionally, many of the exfoliated flakes re-stack together by re-forming van der Waals forces if they could not be properly separated in time. These effects during this exfoliation step led to the formation of exfoliated graphite (referred to as Product (C) in FIG. 1), which is commonly referred to as "graphite worm" in the industry.

The exfoliated graphite or graphite worm is characterized by having networks of interconnected (un-separated) flakes which are typically >50 nm thick (often >100 nm thick). These individual flakes are each composed of hundreds of layers with inter-layer spacing of approximately 0.34 nm (not 0.6 nm), as evidenced by the X-ray diffraction data readily available in the open literature. In other words, these flakes, if separated, are individual graphite particles, rather than graphite intercalation compound (GIC) particles. This thermal shock procedure can produce some separated graphite flakes or graphene sheets, but normally the majority of graphite flakes remain interconnected. Again, the inter-flake distance between two loosely connected flakes or platelets is now increased to from 20 nm to several μm and, hence, the van der Waals forces that hold them together are now very weak, enabling easy separation by mechanical shearing or ultrasonication.

Typically, the exfoliated graphite or graphite worm is then subjected to a sheet or flake separation treatment using air milling, mechanical shearing, or ultrasonication in a liquid (e.g., water). Hence, a conventional process basically entails three distinct procedures: first expansion (oxidation or intercalation), further expansion (so called "exfoliation"), and separation. The resulting NGPs are graphene oxide (GO), rather than pristine graphene.

It is important to note that the separation treatment (e.g. using ultrasonication or shearing) is to separate those thick flakes from one another (breaking up the graphite worm or sever those weak interconnections), and it is not intended for further peeling off individual graphene planes. In the prior art, a person of ordinary skill would believe that ultrasonication is incapable of peeling off non-intercalated/un-oxidized graphene layers. In other words, in the conventional processes, the post-exfoliation ultrasonication procedure was meant to break up graphite worms (i.e., to separate those already largely expanded/exfoliated flakes that are only loosely connected). Specifically, it is important to further emphasize the fact that, in the prior art processes, ultrasonification is used after intercalation and oxidation of graphite (i.e., after first expansion) and most typically after thermal shock exposure of the resulting GIC or GO (i.e., after second expansion or exfoliation) to aid in breaking up those graphite worms. There are already much larger spacings between flakes after intercalation and/or after exfoliation (hence, making it possible to easily separate flakes by ultrasonic waves). This ultrasonication was not perceived to be capable of separating those un-intercalated/un-oxidized layers where the inter-graphene spacing remains <0.34 nm and the van der Waals forces remain strong.

To the best of our knowledge, the applicant's research group was the very first in the world to surprisingly observe that, under proper conditions (e.g., with the assistance of a surfactant), ultrasonication can be used to produce ultra-thin graphene directly from graphite, without having to go through chemical intercalation or oxidation. This invention was reported in a patent application [A. Zhamu, J. Shi, J. Guo, and Bor Z. Jang, "Method of Producing Exfoliated Graphite, Flexible Graphite, and Nano Graphene Plates," U.S. patent Ser. No. 11/800,728 (May 8, 2007)]. Schematically shown in FIG. 2 are the essential procedures used to produce single-layer or few-layer graphene using this direct ultrasonication process. This innovative process involves simply dispersing pristine graphite powder particles in a liquid medium (e.g., water, alcohol, or acetone) containing a dispersing agent or surfactant to obtain a suspension. The suspension is then subjected to an ultrasonication treatment, typically at a temperature between 0° C. and 100° C. for 10-120 minutes. No chemical intercalation or oxidation is required. The graphite material has never been exposed to any obnoxious chemical. This process combines expansion, exfoliation, and separation into one step. Hence, this simple yet elegant method obviates the need to expose graphite to a high-temperature, or chemical oxidizing environment. The resulting NGPs are essentially pristine graphene, which is highly conductive both electrically and thermally.

This direct ultrasonication process may be considered as peeling off graphene layers at a rate of 20,000 attempts per second (if the ultrasonic frequency is 20 kHz) or higher (if higher frequency) per each suspended graphite particle. The resulting NGPs are pristine graphene without any intentionally added or bonded oxygen. This is a powerful approach to the large-scale preparation of pristine NGPs.

After additional research and development work, we have further discovered that a surfactant is not needed if the graphite particles are mixed with a certain liquid or solvent that meets a specific surface energy requirement. The resulting surfactant-free mixture of pristine graphitic particles (non-preintercalated, un-oxidized, un-fluorinated, etc) and solvent is then subjected to direct ultrasonication. This improvement is significant since it eliminates the need to remove a surfactant from this liquid or solvent. In certain applications, the surfactant removal procedure could be challenging, tedious, or expensive, particularly where the NGP-liquid suspension is intended for use directly as a product (e.g., as a conductive ink, coating, or paint) and the presence of a surfactant is undesirable.

The presently invented process is fast and environmentally benign. It can be easily scaled-up for mass production of highly conducting graphene. Again, it is important to emphasize that, in all prior art processes, ultrasonification was used after intercalation and oxidation of graphite (i.e., after first expansion) and, in most cases, after thermal shock exposure of the resulting GIC or GO (after second expansion). In contrast, the presently invented process does not involve pre-oxidizing or pre-intercalating the starting graphite particles.

It may be noted that a few other approaches to producing graphene materials also involve the use of pristine graphite as starting material. The fundamental value of such an approach lies in its avoidance of graphite oxidation and subsequent reduction (typically incomplete reduction only), thereby preserving the desirable electronic properties of graphene. There is precedent for exfoliation of pristine graphite in neat organic solvents without oxidation or surfactants. Hernandez et al reported dispersion of natural graphite using N-methylpyrrolidone (NMP), resulting in individual sheets of graphene at a concentration of ≦0.01 mg/mL [Y. Hernandez, et al, "High-yield production of graphene by liquid phase exfoliation of graphite," *Nature Nanotechnology,* 2008, 3, 563]. This is possible because the energy required to exfoliate graphene is balanced by the solvent-graphene interaction for solvents whose surface energies match that of graphene, resulting in a minimal enthalpy of mixing and possibly negative Gibbs free energy of mixing. This is a liquid phase "dissolution" approach. NMP is a highly polar solvent, and not ideal in cases where reaction chemistry requires a nonpolar medium. Further, it is hygroscopic, making its use problematic when water must be excluded from reaction mixtures.

Hence, it was an object of the present invention to provide a method of mass-producing a pristine nano graphene material that has good electrical conductivity.

It was another object of the present invention to provide a process for mass-producing pristine NGPs without involving the use of any undesirable acid, oxidizing agent, chemical reducing agent, or a surfactant.

It was a further object of the present invention to provide a process for producing ultra-thin NGPs (e.g., those with a thickness less than 1 nm).

Another object of the present invention was to provide a process capable of directly producing a dispersion product containing pristine NGPs and a liquid medium, without having to remove a surfactant or any other chemical from the dispersion.

Still another object of the present invention was to provide a process capable of directly producing a precursor to a composite product, wherein the precursor contains pristine NGPs dispersed in a surfactant-free liquid medium (e.g., a solvent) and a monomer or polymer dissolved therein. This process does not require removal of a surfactant or any other chemical from the solvent. When the solvent is vaporized and monomer cured or synthesized, an NGP-reinforced polymer composite is produced.

A further object of the invention was to provide a versatile process for mass-producing pristine NGPs from a broad range of pristine graphitic materials (e.g. natural graphite, artificial graphite, MCMBs, carbon or graphite fibers, carbon or graphite nano-fibers, graphitic cokes, meso-phase carbon, soft carbon, hard carbon, graphitized pitch, and combinations thereof).

SUMMARY OF THE INVENTION

The present invention provides a method of exfoliating a graphitic material to produce nano-scaled graphene platelets having a thickness smaller than 100 nm, typically smaller than 10 nm, and most typically smaller than 1 nm. The method comprises (a) dispersing particles of a graphitic material in a liquid medium containing no surfactant to obtain a suspension wherein the liquid medium has a low surface tension, characterized as having a contact angle on the graphene plane smaller than 90° (preferably <75°, more preferably <60°, further preferably <45°, and most preferably <30°); and (b) exposing the suspension to ultrasonic waves (a process commonly referred to as ultrasonication) at an energy or power level for a sufficient length of time to produce the separated nano-scaled platelets. This contact angle is measured on the graphene plane, not on the graphene edge surface. The suspension typically has a graphitic material content much greater than 0.1 mg/mL, more typically >1 mg/mL, most typically >10 mg/mL (hence, affording a truly high production yield). The power level is typically above 80 watts, but more typically above 150 watts and, in many cases, above 200 watts.

In the presently invented method, the contact angle between the liquid (e.g., solvent) and the graphene plane (not the edge surface of a graphite crystallite) is the most critical parameter that dictates if direct ultrasonication can produce NGPs directly from a pristine graphitic material without prior intercalation, oxidation, fluorination, or any other chemical treatment.

Using natural graphite as an example, a graphite powder typically contains graphite particles that are 10-500 μm in diameter. Each particle is composed of multiple crystallites demarcated by defected or amorphous carbon boundaries. Each crystallite is basically a stack of typically hundreds of graphene layers bonded together by van der Waals forces in a direction normal to the graphene plane (or basal plane), as schematically shown in FIG. 3(A). The length and width of a crystallite are typically in the range of 100 nm to 10 μm, but can be larger or smaller depending upon the sources of materials or how the graphitic materials were made.

Direct ultrasonication as herein disclosed serves to not only break up the graphite particles into individual crystallites, but also expand, exfoliate, and separate individual graphene planes (or a small stack of graphene planes) from each crystallite to produce ultra-thin, pristine NGPs. Preferably, the ultrasonication step is conducted at a temperature lower than 100° C. The energy (power) level is typically greater than 80 watts, preferably greater than 150 watts. The graphitic material could be natural graphite, synthetic graphite, highly oriented pyrolytic graphite, meso-carbon micro-bead (MCMB), partially graphitized pitch, graphite fiber, graphite nano-fiber, soft carbon, hard carbon, pyrolitic coke, or a combination thereof.

This invented method could involve adding a monomer or polymer into the resulting suspension of nano graphene in solvent. The resulting suspension comprises NGPs dispersed in a monomer- or polymer-containing solvent to form a nanocomposite precursor suspension. This suspension can be converted to a mat or paper (e.g., by following a paper-making process). The nanocomposite precursor suspension may be converted to a nanocomposite solid by removing the solvent or polymerizing the monomer.

It may be noted that ultrasonication was used to separate graphite flakes after exfoliation of pre-intercalated or pre-oxidized natural graphite. Examples are given in Sakawaki, et al. ("Foliated Fine Graphite Particles and Method for Preparing Same," U.S. Pat. No. 5,330,680, Jul. 19, 1994); and Chen, et al. ("Preparation and Characterization of Graphite Nanosheets from Ultrasonic Powdering Technique," Carbon, Vol. 42, 2004, 753-759). However, there has been no report on the utilization of high-power ultrasonic waves in directly exfoliating graphite (without acid intercalation, oxidation, or solvating/dissolving by a solvent) and, concurrently, separating exfoliated particles into isolated or separated graphite flakes or platelets with a thickness less than 10 nm.

Those who are skilled in the art of expandable graphite, graphite exfoliation, and flexible graphite would believe that graphite must be intercalated or oxidized first to obtain a stable intercalation compound or graphite oxide before it could be exfoliated. It is extremely surprising for us to observe that prior intercalation or oxidation is not required of graphite for expansion and exfoliation, and that exfoliation can be achieved by using ultrasonic waves at relatively low temperatures (e.g., room temperature).

Most of the prior art methods of producing NGPs began with natural graphite as the starting material. In the instant application, the graphitic material is not limited to natural graphite; it may be selected from the group consisting of natural graphite, artificial graphite, graphite oxide, graphite fluoride, graphite fiber, carbon fiber, carbon nano-fiber, carbon nano-tube, mesophase carbon micro-bead (MCMB), soft carbon, hard carbon, and combinations thereof. This is not a trivial or obvious extension of the work on natural graphite since these materials have very different surface morphology and other characteristics that could prevent liquid wetting or interaction. Technically, MCMBs are usually obtained from a petroleum heavy oil or pitch, coal tar pitch, or polynuclear hydrocarbon material (highly aromatic molecules). When such a precursor pitch material is carbonized by heat treatment at 400° to 550° C., micro-crystals called mesophase micro-spheres are formed in a non-crystalline pitch matrix.

These mesophase micro-spheres, after being isolated from the pitch matrix (which is typically soluble in selected solvents), are often referred to as meso-carbon micro-beads (MCMB). The MCMBs commercially available are those that have been subjected to a further heat treatment at a temperature in the range of 2,000° C. and 3,000° C. Some of the carbonized pitch is not spherical in shape and can be partially graphitized to generate graphene sheets dispersed in an amorphous carbon matrix.

In many cases, the NGPs produced in our studies have a specific surface area in the range of approximately 300 $m^2$/g to 2,600 $m^2$/g. The NGPs obtained with the presently invented process tend to contain a significant proportion of single-layer graphene (with a thickness of approximately 0.34 nm) or graphene of few layers (<2 nm). The NGP material obtained with this process, when formed into a thin film with a thickness no greater than 100 nm, exhibits an electrical conductivity of typically at least 100 S/cm and quite often higher than 1,000 S/cm.

The presently invented process is superior to many prior art processes in several aspects:

(1) For instance, Aksay, McAllister, and co-workers used thermal exfoliation of completely oxidized graphite (GO) to obtain exfoliated graphite oxide platelets [McAllister, M. J., et al., "Single sheet functionalized graphene by oxidation and thermal expansion of graphite," *Chem. Materials* 19(18), 4396-4404 (2007)]. The process involved exposing the GO to a gas environment at 1,050° C. for 30 seconds or in a propane torch for less than 15 seconds. Such a thermal shock exposure typically produces graphite oxide platelets (rather than nano graphene) that are typically not electrically conducting.

(2) In another commonly used prior art approach, as practiced by Stankovich et al. [S. Stankovich, "Stable aqueous dispersions of graphitic nanoplatelets via the reduction of exfoliated graphite oxide in the presence of poly(sodium 4-styrenesulfonate)," *J. Mater. Chem.* 16, 155-158 (2006)], graphite was heavily oxidized to obtain graphite oxide, which was then mixed with water. The resulting suspension was then subjected to ultrasonication for an extended period of time to produce colloidal dispersions of GO platelets. The graphite oxide dispersion was then reduced with hydrazine, in the presence of poly (sodium 4-styrenesulfonate). This process led to the formation of a stable aqueous dispersion of polymer-coated graphene platelets. However, the reducing agent, hydrazine, is a toxic substance.

(3) Becerril, et al [H. A. Becerril, et al., "Evaluation of Solution-Processed Reduced Graphene Oxide Films as Transparent Conductors," *ACS Nano*, 2 (2008) 463-470] developed a process for producing transparent, yet conducting electrode. The electrode was made by following a very tedious process that involves oxidation of natural graphite to form GO, repeated washing, ultrasonication, and 15 cycles of impurity removal steps that include centrifugation, discarding supernatant liquid, and re-suspending the solid in an aqueous mixture of sulfuric acid and hydrogen peroxide. The suspension was eventually spin-coated on a solid substrate to form a GO thin film, which was then partially reduced by heating the film in a high vacuum at a high temperature for a long period of time. Such a long process does not appear to be amenable to mass production of conducting nano graphene platelets.

(4) Another unexpected benefit of the presently invented process is the observation that the pristine NGPs produced are relatively defect-free, exhibiting an exceptionally high conductivity. In contrast, the heavily oxidized GO platelets are typically highly defected and could not fully recover the perfect graphene structure even after chemical reduction. Therefore, the resulting platelets exhibit a conductivity value lower than that of a more perfect NGP obtained with the presently invented process.

(5) The presently invented process, if desirable, allows for the mixing and dispersion of a wide range of ingredients in the liquid medium (in addition to the produced NGPs) for the purpose of imparting other desirable functionalities to the dispersion. For instance, those ingredients commonly used in a paint or coating formulation may be easily added into the dispersion.

(6) For nanocomposite applications, a resin component (e.g., monomer, oligomer, and polymer) and/or curing agent may be easily added to the suspension to form a precursor solution to a composite. Subsequently, the liquid medium (e.g., solvent) may be removed and the resulting mixture solidified.

BRIEF DESCRIPTION OF THE DRAWINGS

FIG. 10 Transmission electron micrograph of select NGP.

DETAILED DESCRIPTION OF PREFERRED EMBODIMENTS

Figure 1:
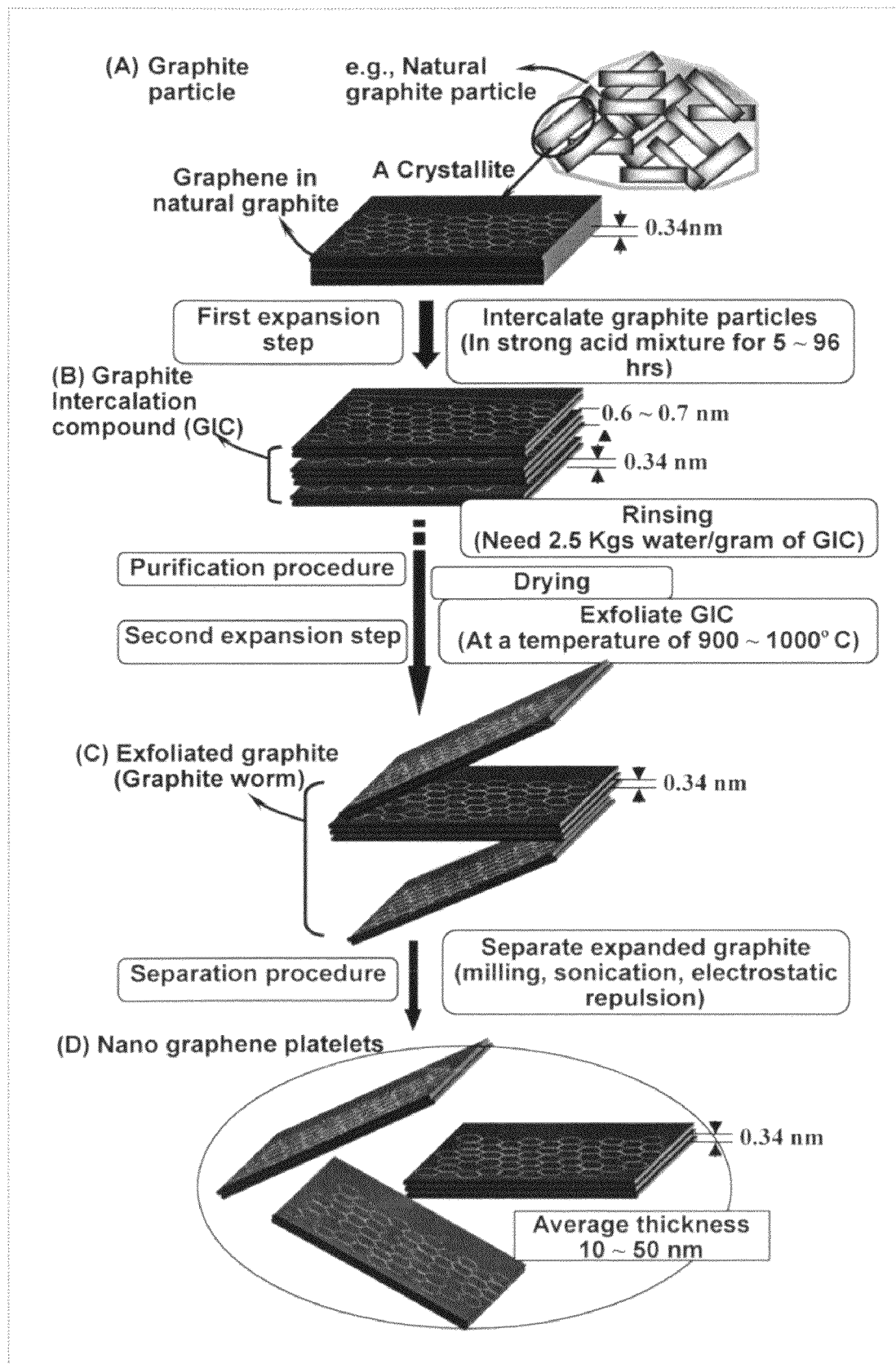
FIG. 1 Conventional, most commonly used chemical processes for producing oxidized NGPs or GO platelets.
Figure 2:
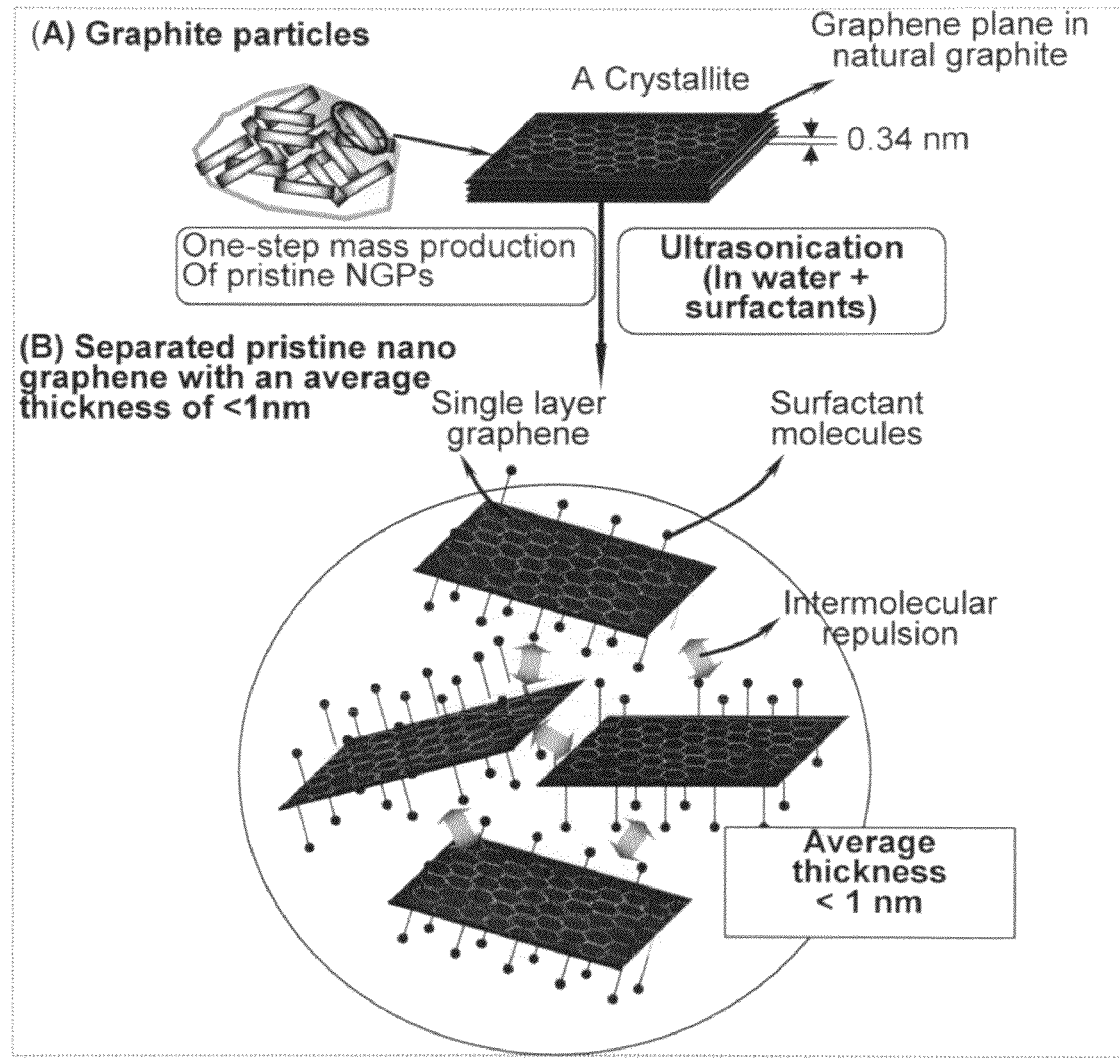
FIG. 2 A surfactant-assisted direct ultrasonication method disclosed earlier by the instant applicants.
Figure 3:
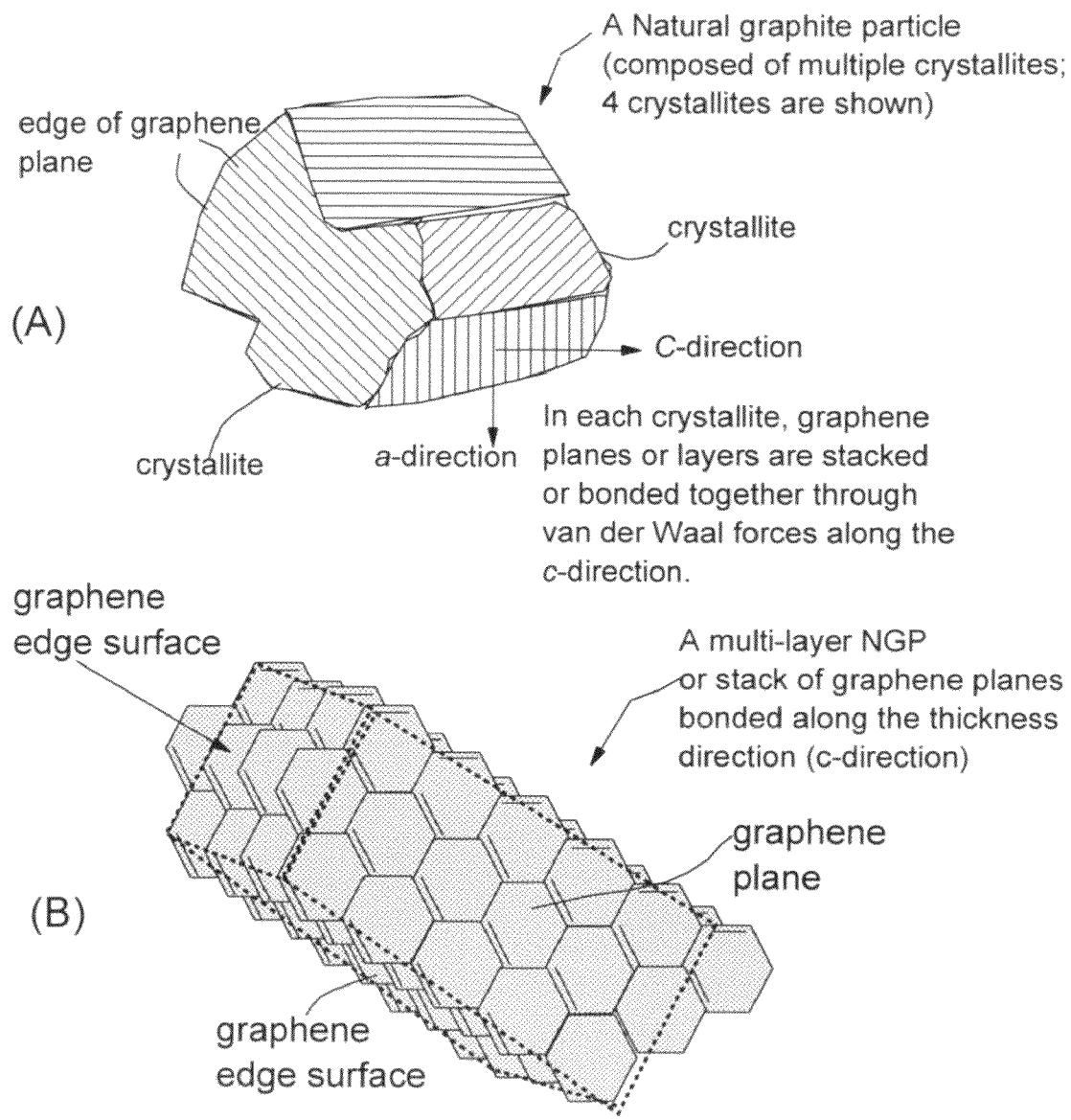
FIG. 3 (A) Schematic of graphite crystallites in a graphitic material; each crystallite is a stack of graphene planes bonded together along the crystallographic c-direction; (B) An isolated NGP having two graphene planes and four edge surfaces.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically of micron- or nanometer sizes. The graphite crystallites are dispersed in or connected by crystal defects or an amorphous phase in a graphite particle, which can be a graphite flake, carbon/graphite fiber segment, carbon/graphite whisker, or carbon/graphite nano-fiber.

One preferred specific embodiment of the present invention is a method of producing a nano graphene platelet (NGP) material that is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each platelet has a length and a width parallel to the graphene plane and a thickness orthogonal to the graphite plane. The thickness of an NGP is 100 nanometers (nm) or smaller and more typically thinner than 10 nm with a single-sheet NGP being as thin as 0.34 nm. The length and width of a NGP are typically between 1 μm and 10 μm, but could be longer or shorter. For certain applications, both length and width are smaller than 1 μm.

The method is capable of concurrently exfoliating and separating a graphitic material to produce pristine. The method comprises no pre-intercalation or pre-oxidation step since the starting material is a pristine graphitic material. The method comprises: (a) providing a pristine graphitic material comprising at least a graphite crystallite having a graphene plane and an edge surface; (b) dispersing multiple particles of said graphitic material in a liquid medium containing therein no surfactant to produce a suspension, wherein the liquid medium is characterized by having a surface free energy that enables wetting of the liquid on a graphene plane; and (c) exposing the suspension to direct ultrasonication at an energy or intensity level (e.g. >150 watts) for a sufficient length of time to produce the nano graphene platelets. The concentration of the starting material in the solvent is typically much higher than 0.1 mg/mL, and more typically higher than 1 mg/mL, and most typically higher than 10 mg/mL, implying that this is a truly high production yield process.

The first step may involve preparing a graphitic material powder, such as fine graphite particulates, short segments of carbon fiber or graphite fiber, carbon or graphite whiskers, carbon or graphitic nano-fibers, MCMBs, pyrolitic cokes, or their mixtures. The length and/or diameter of these graphite particles are preferably less than 0.2 mm (200 μm), further preferably less than 0.01 mm (10 μm). They can be smaller than 1 μm. The graphite particles are known to typically contain micron- and/or nanometer-scaled graphite crystallites with each crystallite being composed of multiple graphene sheets bonded by van der Waals forces.

The second step of the presently invented method comprises dispersing a pristine graphitic material in a liquid medium (e.g., a low surface tension solvent) to obtain a suspension with the particles being suspended in the liquid medium. The suspension is then subjected to high-power ultrasonication (e.g., typically >>80 watts, but more typically >150 watts) typically at 0-100° C. (more typically at approximately 20° C.) for 30 minutes (can be longer or shorter). Typically, the starting pristine graphite material is in the concentration of >1-10 mg/mL. Typically, 30 minutes were all that was needed to create ultra-thin NGPs well-dispersed in the solvent. When a proper solvent was used, essentially no large graphite particle (e.g. >100 nm) was found after ultrasonication for 30 minutes. No centrifuging step was required to remove excessively large graphite particles. In other words, essentially >99% of the graphite particles was effectively exfoliated for most of the samples. For some graphite fibers, less than 99% but greater than 95% was exfoliated to become NGPs. This is in sharp contrast to the typically less than 10% of effectiveness in other processes (e.g., Hernandez, et al, to be further discussed later)

Most importantly, we have surprisingly found that the low surface tension solvent and high-power ultrasonic waves work in concert to facilitate the expansion, exfoliation and separation of graphene planes from the graphitic material. In order to understand why low surface tension solvents work well to assist ultrasonic waves in producing ultra-thin graphene, we conducted a very extensive surface tension and contact angle measurement study. More than 50 solvents or liquid media were investigated. The contact angle measurements began with the preparation of several "graphene blocks." A sufficient quantity of ultra-thin, pristine graphene platelets, upon solvent removal, was compressed in a steel mould using a hydraulic hot press. The mould cavity was approximately 2 cm×2 cm×2 cm in dimensions. The pressing procedure was carried out in such a manner that a majority of the platelets are more or less parallel to one another, as confirmed by scanning electron microscopy. After washing with acetone, each resulting block has two "graphene planes" and four "edge surfaces" for use in the contact angle measurement using a horizontal optical microscope.

Contact angle is a convenient measure of wettability because it is sensitive to the variation of surface properties. A low contact angle (θ) indicates a good wetting. In an ideal gas-liquid-solid system, where the solid is smooth, homogeneous planar and non-deformable, the contact angle θ is related to the surface tension and to the interfacial energies by the well-known Young's equation, Eq. (1):

$$\cos \theta_o = (\gamma_{sg} - \gamma_{sl})/\gamma_{lg} \quad (1)$$

where $\theta_o$ is the Young's angle or the intrinsic contact angle, $\gamma_{sg}$ is the surface energy of the solid in the presence of the vapor of the liquid, $\gamma_{lg}$ is the surface tension or surface free energy of the liquid and $\gamma_{sl}$ is the interfacial solid-liquid energy. Rearranging Eq. (1), we have $\gamma_{lg} \cos \theta_o = (\gamma_{sg} - \gamma_{sl})$. For wetting of a liquid on a surface to occur, one must have $0° \leq \theta_o \leq 90°$ and $1 \geq \cos \theta_o \geq 0$. With those parameters, a parameter $S_l$ was defined:

$$S_l = \gamma_{sg} - \gamma_{sl} - \gamma_{lg} \cos \theta_o \quad (2)$$

At a critical condition, $\theta_o = 0°$, $S_l$ becomes the spreading coefficient $S = \gamma_{sg} - \gamma_{sl} - \gamma_{lg}$. If $S > 0$, the wetting is complete and if $S < 0$, there is partial wetting.

Figure 4:
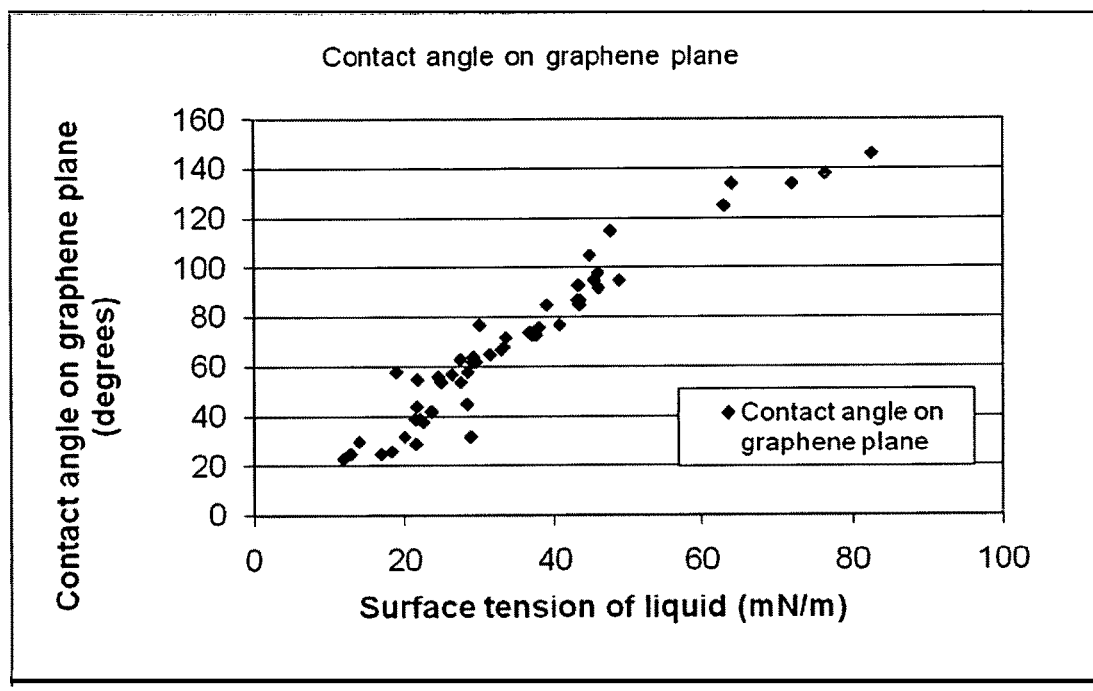
FIG. 4 Graphene plane contact angle values of various liquids plotted as a function of liquid surface tension.

We measured the contact angles of more than 50 solvents on both the graphene plane and the edge surface of a graphene block. The data are summarized in FIGS. 4 and 5, respectively. FIG. 4 demonstrates that the solvent contact angle on a graphene plane scales with the surface tension of the solvent. Although not shown in FIG. 4, the raw data indicated that the solvents with a contact angle higher than 90 degrees (e.g., glycerol) were ineffective in helping high-power ultrasonication to produce NGPs from a pristine graphitic material. Some of the solvents with a contact angle between 75 and 90 degrees were effective (e.g., N,N-dimethyl formamide, DMF), but others were not (e.g., N,N-dimethyl acetamide, DMA). All the solvents with a contact angle lower than 75 degrees were found to be effective in promoting the production of NGPs using direct ultrasonication.

Figure 5:
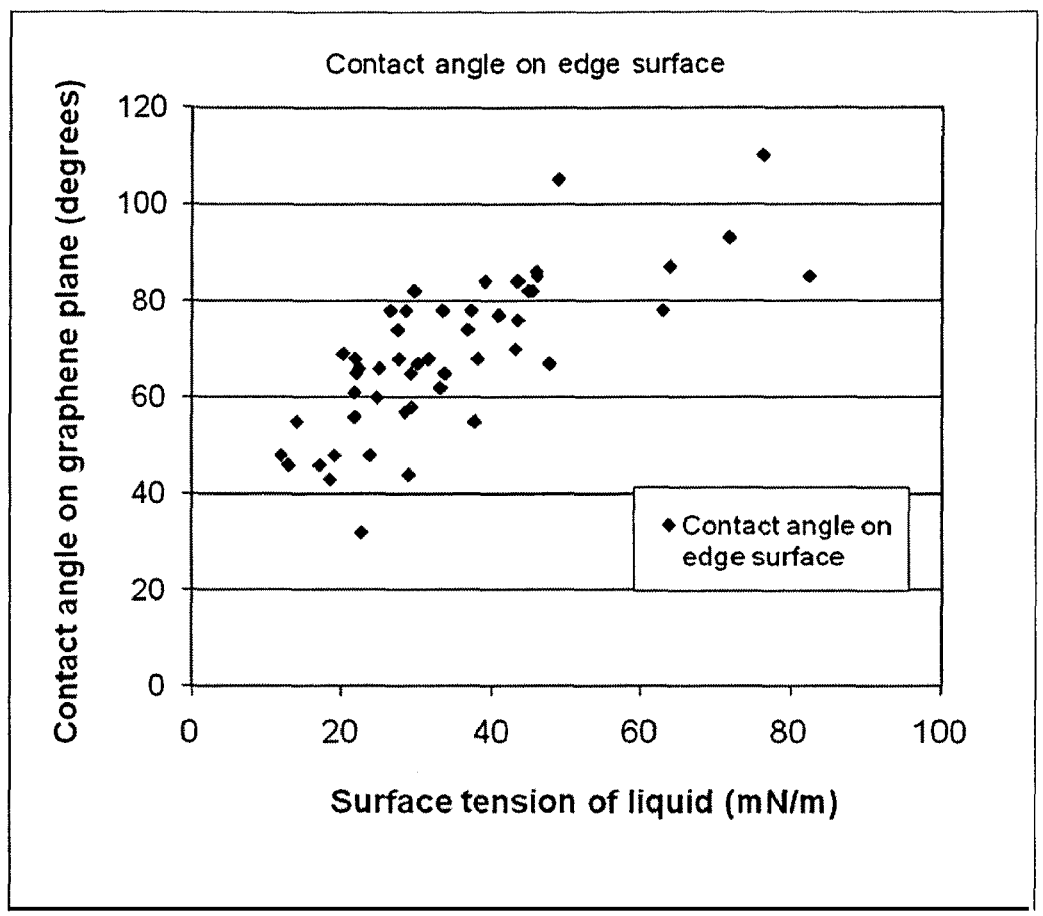
FIG. 5 Graphene edge surface contact angle values of various liquids plotted as a function of liquid surface tension.
Figure 6:
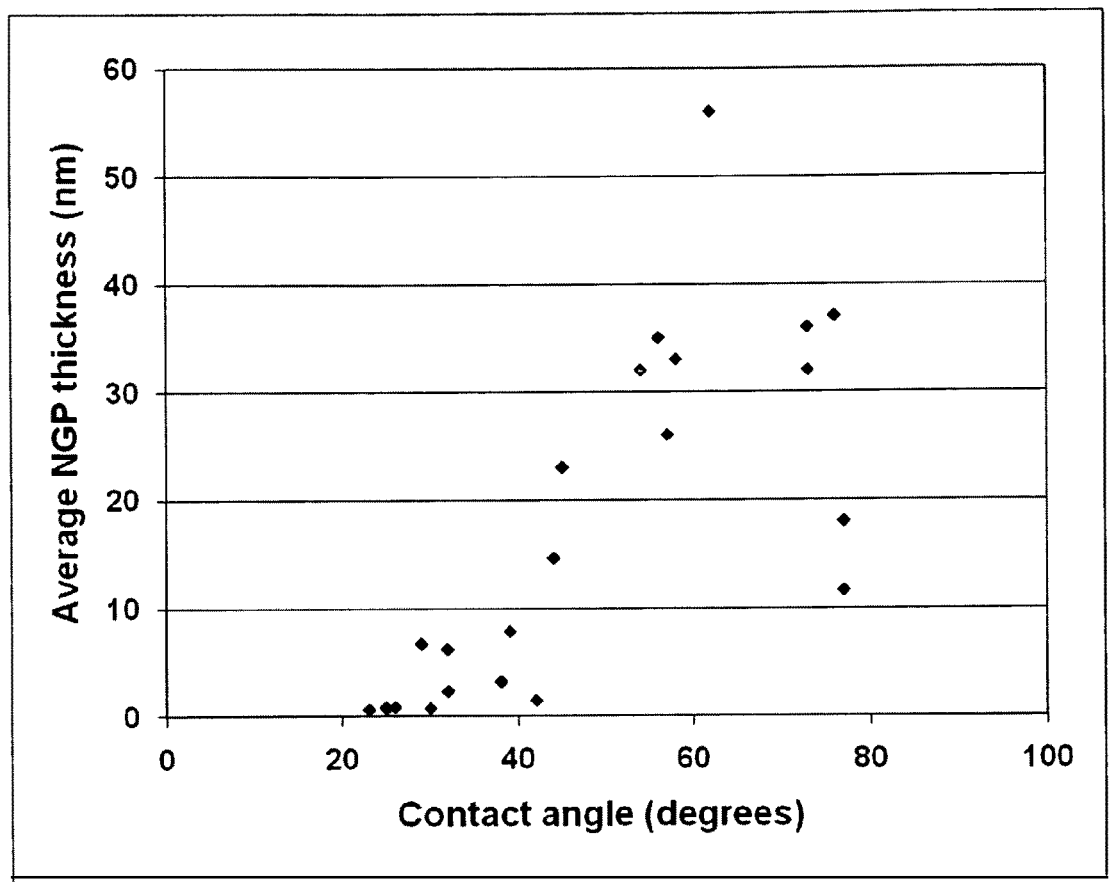
FIG. 6 Average thickness of NGPs obtained by direct ultrasonication in various liquids, platted as a function of graphene plane contact angle values.

The much higher degree of data scattering in FIG. 5 indicates that the contact angle on the edge surface is not an effective or reliable criterion with which one can determine if a given solvent is an effective solvent in the process of direct ultrasonication. We proceeded to measure the average thickness of NGPs in 30 samples. The results are summarized in FIG. 6 and Table 1 below:

TABLE 1

Surface tension of selected solvents, their graphene plane contact angles, and the average thickness of the NGPs produced by direct ultrasonication.

| Liquid | Surface tension γ (mN/m) | Graphene plane Contact angle | Platelet thickness (nm) |
|---|---|---|---|
| Acetic acid | 27.6 | 54 | 32 |
| Formic acid | 37.58 | 77 | 36 |
| Acetone | 23.7 | 42 | 1.4 |
| Diethyl ether | 17 | 25 | 0.8 |
| Ethanol | 22.27 | 39 | 7.8 |
| Ethanol (40%) + Water | 29.63 | 62 | 56 |
| Ethanol (11.1%) + Water | 46.03 | 92 | 310 |
| Glycerol | 63 | 125 | 325 |
| n-Hexane | 18.4 | 26 | 0.85 |
| Isopropanol | 21.7 | 29 | 6.7 |
| Methanol | 22.6 | 38 | 3.2 |
| n-Octane | 21.8 | 44 | 14.6 |
| Benzene | 28.88 | 32 | 6.2 |
| Methyl ethyl ketone (MEK) | 24.6 | 56 | 35 |
| N,N-dimethyl acetamide (DMA) | 36.7 | 82 | 287 |
| N,N-dimethyl formamide (DMF) | 37.1 | 78 | 32 |
| N-methyl-2-pyrrolidone, NMP | 40.79 | 77 | 11.6 |
| n-Heptane | 20.14 | 32 | 2.3 |
| Perfluoroheptane | 12.85 | 25 | 0.67 |
| Perfluorohexane | 11.91 | 23 | 0.61 |
| Perfluorooctane | 14 | 30 | 0.72 |
| Polyethylen glycol 200 (PEG) | 43.5 | 87 | 315 |
| Polydimethyl siloxane | 19 | 58 | 33 |
| Pyridine | 38 | 76 | 37 |
| Tetrahydrofuran (THF) | 26.4 | 57 | 26 |
| Toluene | 28.4 | 45 | 23 |
| o-Xylene | 30.1 | 77 | 18 |

These data demonstrate that the average NGP thickness obtained by the instant direct ultrasonication approach is closely related to the contact angle of the solvent used. In general, a smaller contact angle on the graphene plane leads to thinner NGPs. With a contact angle <45 degrees, the NGP average thickness is <20 nm. A contact angle <30 degrees leads to NGPs with an average thickness <10 nm and, in many cases, <1 nm (with a significant portion being single-layer graphene).

Figure 7:
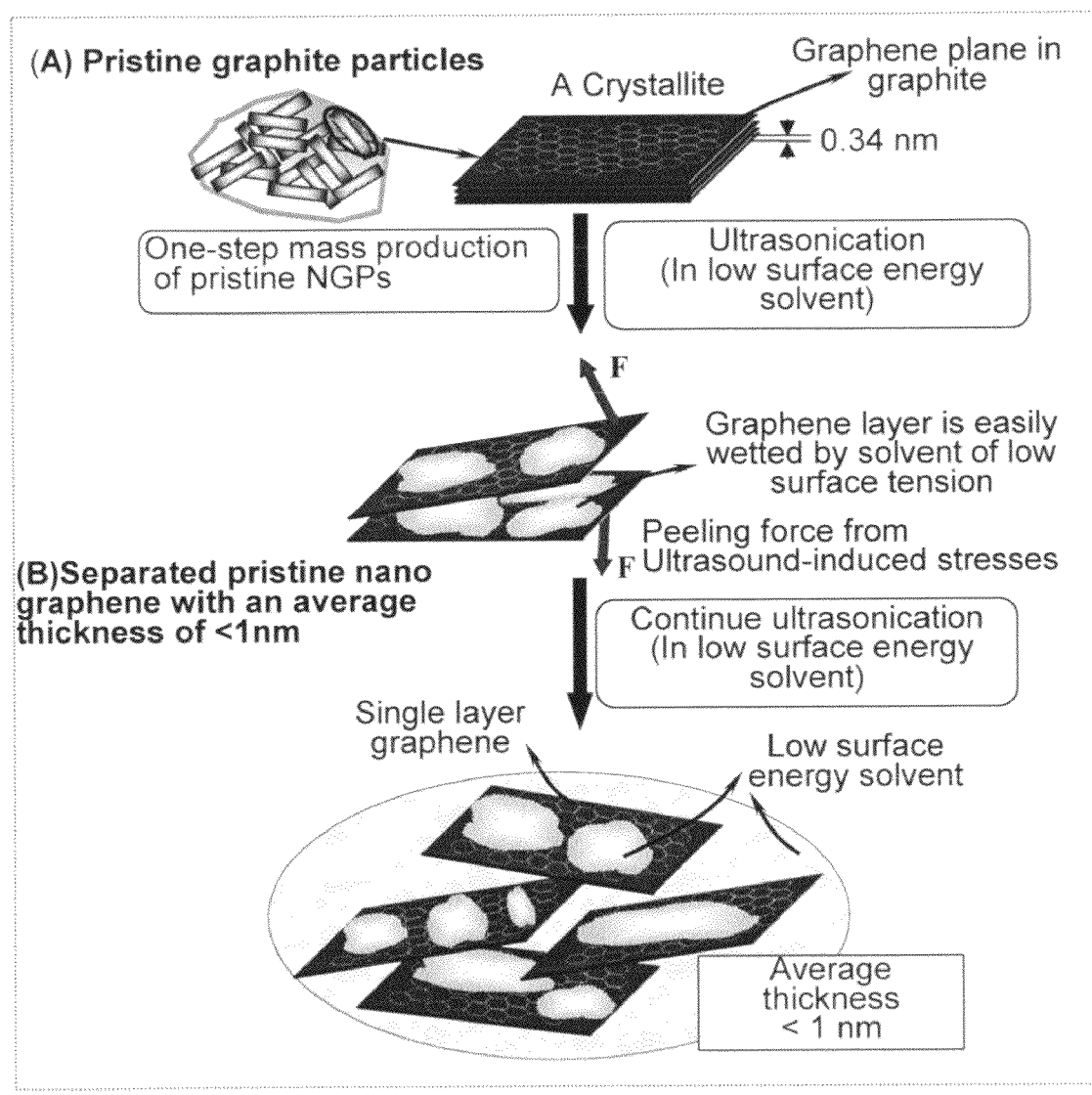
FIG. 7 A perceived view of how low surface tension solvent-assisted direct ultrasonication works to produce ultra-thin graphene sheets.

Not wishing to be bound by any theory, but the applicants speculate that a solvent with a low surface tension value and providing a graphene plane contact angle <75 degrees is particularly effective in helping ultrasonic waves to exfoliate and separate graphene planes from graphite crystallites in the following ways:

This direct ultrasonication process may be considered as opening up graphene planes or peeling off graphene layers at a rate of 20,000 attempts per second (if the ultrasonic frequency is 20 kHz) or higher (if higher frequency) per each suspended graphite particle. Ultrasonic waves can generate tensile, compressive, and (locally) shear stresses to graphite particles. In a given cycle, using tensile and compressive stresses as an example, the first half of a cycle may be a positive stress half-cycle (hence possibly acting to open up the edge of a graphene plane relative to its neighboring graphene plane). However, during the next half-cycle, the same graphene plane may be subjected to a compressive stress (possibly acting to close up the opening). If a solvent with a low surface tension is present, the solvent molecules could quickly spread onto the freshly created graphene plane (during the positive-stress half cycle), preventing the expanded or opened-up graphene planes from completely re-tacking due to van der Waals forces. Since the ultrasonic wave frequencies are high, the positive and negative half cycles alternate very rapidly and the solvent must be capable of wetting and spreading at a high rate. Solvents with a high surface tension would unlikely have such ability. The contact angle is a good way to gauge the ability of a solvent to undergo rapid spreading. This concept may be illustrated in FIG. 7.

Typically, the starting pristine graphite material is in the concentration of 1-50 mg/mL. As high as 100 mg/mL has been used, and this is not an upper bound. The resulting NGPs are pristine graphene without any intentionally added or bonded oxygen. This is a powerful approach to the large-scale preparation of pristine NGPs directly from pristine graphitic materials.

As indicated earlier, Hernandez et al disclosed that graphite could be dispersed in some solvents. In particular, the graphite was partially exfoliated to multilayer structures in N-methylpyrrolidone (NMP), γ-butyrolactone (GBL) and 1,3-dimethyl-2-imidazolidinone (DMEU) [Y. Hernandez, et al, *Nature Nanotechnology*, 2008, 3, 563]. The question was what solvent properties led to this exfoliation of graphite and why? According to Hernandez et al, such exfoliation could only occur if the net energetic cost is very small. In thermodynamics, this energy balance is expressed as the enthalpy of mixing (per unit volume), which may be given as:

$$\frac{\Delta H_{mix}}{V_{mix}} \approx \frac{2}{T_{flake}}(\delta_G - \delta_{sol})^2 \phi \tag{3}$$

where $\delta_i = (E_{sur}^i)^{1/2}$ is the square root of the surface energy of phase i, $T_{flake}$ is the thickness of a graphene flake, and φ is the graphene volume fraction. This equation shows the enthalpy of mixing is dependent on the balance of graphene and solvent surface energies. For graphite, the surface energy is defined as the energy per unit area required to overcome the van der Waals forces when peeling two sheets apart. Since the entropy of mixing between a large molecule (graphene) and a solvent is very small, the goal was to find solvents that lead to a minimal $\Delta H_{mix}/V_{mix}$ so that the Gibbs free energy of mixing, $\Delta G_{mix}/V_{mix} = (\Delta H_{mix}/V_{mix}) - T \Delta S_{mix}/V_{mix}$, can be negative and graphene can be at least partially dissolved (mixed) in the solvent.

Fernandez et al suggested that, based on equation (3), a minimal energy cost of exfoliation is expected for solvents whose surface energy matches that of graphite. To test this, Fernandez et al dispersed graphite in a range of solvents. By measuring the optical absorbance after mild centrifugation and using the absorption coefficient (660 nm) to transform absorbance into concentration, they could quantify the amount of graphite flakes dispersed as a function of solvent surface energy (calculated from surface tension). The dispersed concentration shows a strong peak for solvents with a surface energy very close to the literature values of the nanotube/graphite surface energy (i.e. ~70-80 mN/m or mJ/m²). Coupled with equation (3), this seems to suggest that not only is the enthalpy of mixing for graphite dispersed in good solvents very close to zero, but the solvent-graphite interaction is van der Waals rather than covalent. In addition and most importantly, Hernandez et al predicted that good solvents are characterized by surface tensions in the region of 40-50 mN/m.

It may be noted that the approach of Hernandez et al relies on matching the surface tension of a solvent to that of graphite so that the solvent can make its way into the inter-graphene spacings. In other words, the favorable solvent-graphite interaction is sufficient to overcome the graphene-graphene bonds (which are van der Waals forces) to "solvate" or dissolute graphene sheets (molecules). In actuality, these "good" solvents serve as an intercalant that penetrates into some of the inter-graphene spacings, thereby expanding the graphene-graphene separations and significantly weakening the graphene-graphene bonds in some regions. Subsequently, low-intensity ultrasonication (in a laboratory sonic cleaning bath) was used to help separate and disperse these expanded graphene layers from other non-solvated or non-intercalated portions (the non-solvated portions were typically >>90% in all cases, resulting in less than 10% yield).

Thermodynamically, these good solvents should be capable of "dissolving" graphite given a sufficient length of solvent immersion time, and ultrasonication is not really required. Specifically, the "good solvent" acts to solvate or dissolve individual graphene sheets, which are aromatic molecules in a hexagon structure. The good solvent has a surface tension in the range of 40-50 mN/m, not above and not below these values; otherwise, the enthalpy of mixing would not be close to zero and this approach would not work. This is fundamentally different from the discovery of the instant application in that, in general, the lower the solvent surface tension (and the lower the graphene plane contact angle), the more effective the solvents are in rapidly spreading on the graphene plane (which is opened up by ultrasonic waves). Our solvents of low surface tension do not have to play the role of "opening up," "solvating," or "dissolving" graphene sheets. The high-power ultrasonic waves do just that. By contrast, Henandez et al did not use high-power ultrasonic waves to open up graphene planes to facilitate dissolution of graphite in a solvent (the good solvent does that job). Instead, they used low-power sonic waves to separate those limited amounts of solvated graphene planes or stacks of graphene planes from the un-solvated portions.

Furthermore, Hernandez et al meticulously suggested that high power ultrasonication must not be used to avoid destruction of the graphene sheets. Further, in a typical solvent dissolution experiment, as disclosed by Hernandez et al, a maximum graphite concentration of 0.1 mg per mL of solvent was used and typically only 2.5-8.3% of the graphite was exfoliated to become multi-layer graphene. This implies that as small as 0.00025 mg-0.00083 mg is produced per 1 mL of solvent. This is really a poor production yield and not suitable for large-scale production of ultra-thin graphene. By contrast, given the same ultrasonication time (30 minutes), we were able to produce more than 10 mg of graphene per mL of low surface tension solvent, which are more than four (4) orders of magnitude higher. In general, in our cases, more than 99% of the graphitic material particles present in the suspension were effectively exfoliated to become NGPs.

Figure 8:
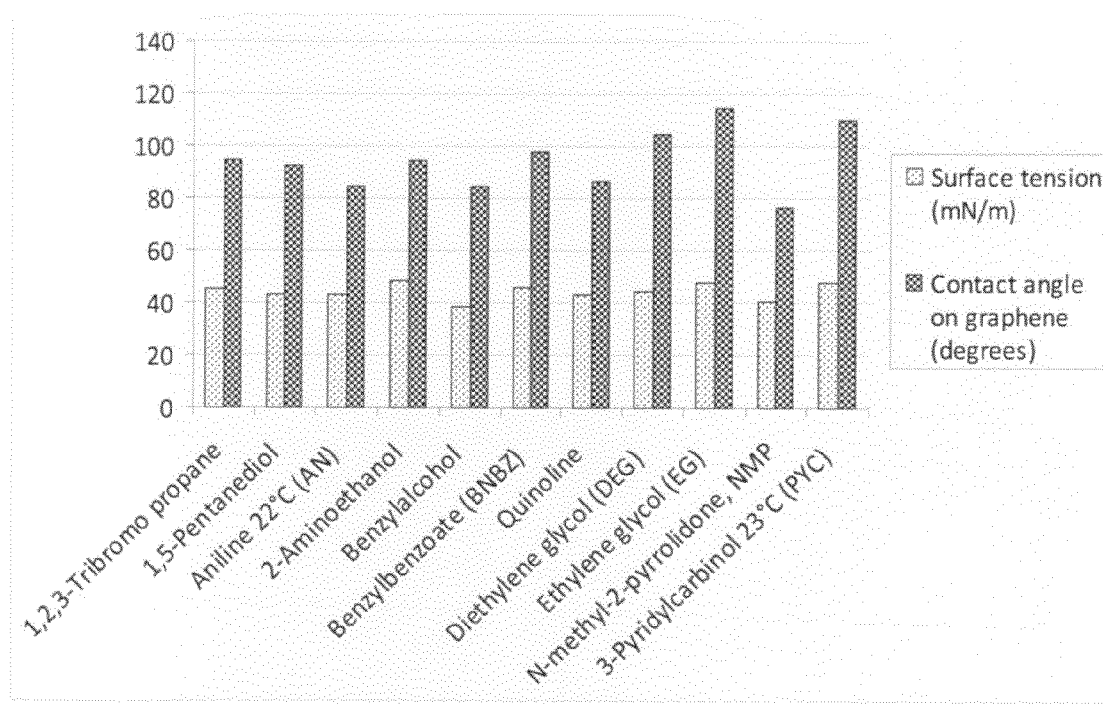
FIG. 8 The graphene surface contact angle data for those liquids considered "good solvents" for solvating or dissolving graphene molecules according to the approach of Hernandez, et al. These data indicate that these good solvents exhibit too high a contact angle to be useful or effective for the solvent-assisted direct ultrasonication of the instant application.

FIG. 8 shows the graphene plane contact angles of 11 liquids that have a surface tension in the best range (40-50 mN/m) for good solvents as specified by Hernandez et al. It is clear that most of the contact angles are much higher than 80 degrees. Clearly, these solvents are not effective liquids in helping out on our direct ultrasonication processes. What Hernandez et al considered the best solvent, benzyl benzoate (BNBZ, with a perfect surface tension value of 45.97 mN/m), actually fairs very poorly in terms of the graphene plane contact angle (98 degrees) and the effectiveness in helping out the ultrasonic waves for producing NGPs (average graphite crystallite size of 285 nm, although a very small amount of NGPs was recovered). These observations further validate the assertion that the low surface tension liquid approach of the instant application is fundamentally different and patently distinct from the "good" solvent dissolution or solvating approach of Hernandez et al. one skilled in the art would not and could not anticipate the surprising discovery of the instant application based on the teaching Hernandez, et al. or a combination of the teachings by Hernandez et al and others in the art.

Conventional exfoliation processes for producing graphite worms from a graphite material normally include exposing a graphite intercalation compound (GIC) to a high temperature environment, most typically between 850 and 1,050° C. These high temperatures were utilized with the purpose of maximizing the expansion of graphite crystallites along the c-axis direction. Unfortunately, graphite is known to be subject to oxidation at 350° C. or higher, and severe oxidation can occur at a temperature higher than 650° C. even just for a short duration of time. Upon oxidation, graphite would suffer from a dramatic loss in electrical and thermal conductivity. These are energy-intensive processes. In contrast, the presently invented method makes use of an ultrasonication temperature typically lying between 0° C. and 100° C. Hence, this method obviates the need or possibility to expose the graphitic material to a high-temperature, oxidizing environment.

Ultrasonic energy also enables the resulting platelets to be well dispersed in the very liquid medium, producing a homogeneous suspension. One major advantage of this approach is that exfoliation, separation, and dispersion are achieved in a single step. A monomer, oligomer, or polymer may be added to this suspension to form a suspension that is a precursor to a nanocomposite structure. In some cases, the dispersing medium may contain the monomer or polymer even before ultrasonication process begins. The process may include a further step of converting the suspension to a mat or paper (e.g., using any well-known paper-making process), or converting the nanocomposite precursor suspension to a nanocomposite solid. Alternatively, the resulting platelets, after drying to become a solid powder, may be mixed with a monomer to form a mixture, which can be polymerized to obtain a nanocomposite solid. The platelets can be mixed with a polymer melt to form a mixture that is subsequently solidified to become a nanocomposite solid.

The following examples serve to provide the best modes of practice for the present invention and should not be construed as limiting the scope of the invention:

EXAMPLE 1

Nano-scaled Graphene Platelets (NGPs) from Natural Graphite

Five grams of natural graphite, ground to approximately 20 μm or less in sizes, were dispersed in 1,000 mL of n-Heptane. An ultrasonic energy level of 200 W (Branson S450 Ultrasonicator) was used for exfoliation and separation of graphene planes for a period of ½ hours. The average thickness of the resulting NGPs was 2.1 nm.

EXAMPLE 2

Ultrasonication of Natural Graphite Using a Solvent of High Surface Tension

Five grams of natural graphite, ground to approximately 20 μm or less in sizes, were dispersed in 1,000 mL of glycerol (surface tension=63 mN/m and graphene surface contact angle=125 degrees) to obtain a suspension. An ultrasonic energy level of 150 W (Branson S450 Ultrasonicator) was used for a period of 1 hour. Graphite particles were broken down to approximately 300 nm in thickness. Very few NGPs were recovered from the suspension after one hour.

EXAMPLE 3

NGPs from MCMBs

Five grams of MCMBs (supplied from Shanghai Shan Shan Tech Co.) with an average particle size of approximately 18 μm, were dispersed in 1,000 mL of benzene. An ultrasonic energy level of 250 W (Branson S450 Ultrasonicator) was used for the exfoliation and separation of graphene planes for a period of ½ hours. The average thickness of the resulting NGPs was 6.2 nm. When a lower surface tension liquid (Perfluorohexane, surface tension of 11.91 mN/m and contact angle of 23 degrees) was used, the average NGP thickness was 0.61 nm, indicating that most of the NGPs were single-layer graphene.

EXAMPLE 4

Thermal Exfoliation and Separation of Graphite Oxide

Graphite oxide was prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å).

Dried graphite oxide powder was then placed in a tube furnace pre-set at a temperature of 1,050° C. for 60 minutes. The resulting exfoliated graphite was subjected to low-power ultrasonication (60 watts) for 10 minutes to break up the graphite worms and separate graphene layers. Several batches of graphite oxide (GO) platelets were produced under identical conditions to obtain approximately 2.4 Kg of oxidized NGPs or GO platelets (Sample 4a).

A similar amount of GO platelets was obtained and then subjected to chemical reduction by hydrazine at 140° C. for 24 hours. The GO-to-hydrazine molecular ratio was one-to-five. The chemically reduced GO platelets are referred to as Sample 4b.

A similar amount of pristine NGPs was prepared under conditions identical to Example 1. These pristine NGPs are herein referred to as Sample 4c.

Figure 9:
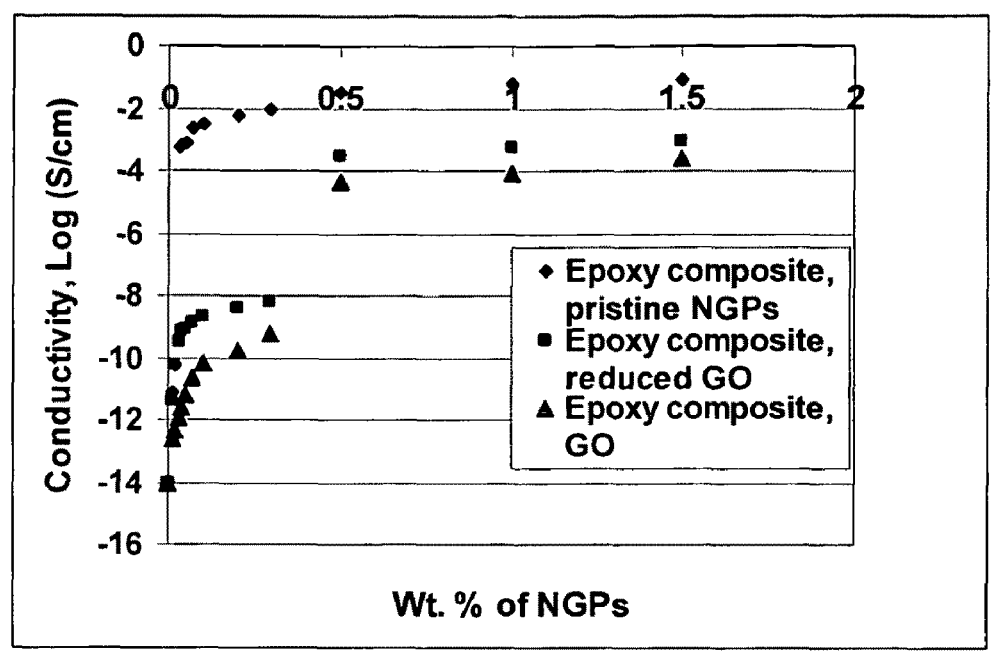
FIG. 9 The electrical conductivity data of three series of NGP-epoxy composites, one featuring pristine graphene as a reinforcement, the second chemically reduced graphite oxide, and the third graphite oxide platelets.

Samples 4a, 4b, and 4c were then mixed with epoxy resin (Epon 862 and Epikure W) at various NGP proportions to obtain three series of NGP-epoxy composite materials for electrical conductivity measurements. The four-point probe method was used to measure the electrical conductivity of all composite samples each of approximately 2.5 cm×2.5 cm×0.5 cm. The in-plane conductivity data of the three series of NGP nanocomposites are summarized in FIG. 9.

These data clearly show that the electrical conductivity of pristine NGP composites is typically several orders of magnitude higher than that of GO platelet composites. Even after some lengthy chemical reduction of GO, the conductivity of reduced GO platelet-epoxy composites is still much lower than that of pristine NGP composites.

Furthermore, the percolation threshold (the critical weight percentage of NGPs or GO platelets) above which platelets overlap to form a network of electron-conducting paths in a polymer matrix for pristine NGPs, was approximately 0.03% while that for GO platelets was 0.5%. These impressive results demonstrate the outstanding properties of pristine graphene obtained by the processes of the instant application.

EXAMPLE 5

NGPs from Short Carbon Fiber Segments

The procedure was similar to that used in Example 1, but the starting material was graphite fibers chopped into segments with 0.2 mm or smaller in length prior to dispersion in water. The diameter of carbon fibers was approximately 12 μm. After ultrasonication for 2 hours at 160 W, the platelets exhibit an average thickness of 4.8 nm.

EXAMPLE 7

NGPs from Carbon Nano-Fibers (CNFs)

A powder sample of graphitic nano-fibers was prepared by introducing an ethylene gas through a quartz tube pre-set at a temperature of approximately 800° C. Also contained in the tube was a small amount of nano-scaled Cu—Ni powder supported on a crucible to serve as a catalyst, which promoted the decomposition of the hydrocarbon gas and growth of CNFs. Approximately 2.5 grams of CNFs (diameter of 10 to 80 nm) were dispersed in methanol. The sample was then subjected to ultrasonication at 20° C. for two hours to effect exfoliation and separation. Fine NGPs with an average thickness of 2.5 nm were obtained.

EXAMPLES 8-33

NGPs from Various Solvents

Solvents listed in Table 1 were used respectively to assist in the production of NGPs from natural graphite using the direct ultrasonication approach. All samples were obtained at approximately 20-25° C. for 30 minutes at a power of 200 watts.

In conclusion, the presently invented method has many advantages over prior art methods of exfoliating graphite materials for producing nano graphene platelets. Summarized below are some of the more salient features or advantages:

(1) The present method is versatile and applicable to essentially all graphitic materials including, but not limited to, natural graphite, artificial graphite (e.g., highly oriented pyrolytic graphite, HOPG), graphite fluoride, graphite fiber, carbon fiber, carbon nano-fiber, carbon nano-tube, mesophase carbon micro-bead (MCMB), graphitized soft carbon, hard carbon, and graphitic coke.

(2) A large concentration of starting graphitic material can be ultrasonicated with an efficiency typically >99%. This is an extraordinarily high production yield process.

(3) The method does not involve a high exfoliation temperature (e.g., typically below 100° C.) and, hence, avoids undesirable high-temperature chemical reactions (e.g., avoids oxidation of graphite). The resulting NGPs exhibit excellent conductivity.

(4) The method makes use of a pristine graphitic material. The prior art step of intercalation, which typically involves using an undesirable acid such as sulfuric and nitric acid, can be avoided in the presently invented method. Hence, this is a much more environmentally benign process. This method is applicable to a wide range of liquid media. Expansion, exfoliation, separation, and dispersion are essentially combined into one step.

(5) A large number of solvents with a low surface tension can be chosen. Depending upon a specific end use, there is always a suitable liquid medium that can be selected. No other prior art approach is nearly as versatile as this approach.

(6) This method is amenable to the preparation of various precursor forms (e.g., suspension, paper, mat, thin film, and lamina) to nanocomposites.

The invention claimed is:

1. A method of producing pristine nano graphene platelets, said method comprising:
   a) providing a pristine graphitic material comprising at least a graphite crystallite having at least a graphene plane and an edge surface, wherein said pristine graphitic material is defined as a graphitic material that has never been subjected to intercalation, chemical oxidation, fluorination, solvating or dissolving by a solvent;
   b) dispersing multiple particles of said pristine graphitic material in a liquid medium containing therein no surfactant to produce a suspension, wherein said multiple particles in said liquid have a concentration greater than 0.1 mg/mL and said liquid medium is characterized by having a surface tension that enables wetting of said liquid on a graphene plane exhibiting a contact angle less than 90 degrees; and
   c) exposing said suspension to direct ultrasonication at a sufficient energy or intensity level for a sufficient length of time to produce said nano graphene platelets.

2. The method of claim 1 wherein said contact angle is less than 75 degrees.

3. The method of claim 1 wherein said contact angle is less than 60 degrees.

4. The method of claim 1 wherein said contact angle is less than 45 degrees or said nano graphene platelets have an average thickness less than 20 nm.

5. The method of claim 1 wherein said contact angle is less than 30 degrees or said nano graphene platelets have an average thickness less than 10 nm.

6. The method of claim 1 wherein said nano graphene platelets have an average thickness less than 1 nm.

7. The method of claim 1 wherein said liquid medium has a surface tension value lower than 40 mN/m.

8. The method of claim 1 wherein said liquid medium has a surface tension value lower than 30 mN/m.

9. The method of claim 1 wherein said liquid medium has a surface tension value lower than 20 mN/m.

10. The method of claim 1 wherein said suspension has a graphitic material concentration greater than 1 mg/mL.

11. The method of claim 1 wherein said suspension has a graphitic material concentration greater than 10 mg/mL.

12. The method of claim 1 wherein at least 99% of the pristine graphitic material is converted into nano graphene platelets.

13. The method of claim 1 wherein said ultrasonication step is conducted at a temperature lower than 100° C.

14. The method of claim 1 wherein said energy level is greater than 150 watts.

15. The method of claim 1 wherein said energy level is greater than 250 watts.

16. The method of claim 1 wherein said pristine graphitic material comprises a material selected from the group consisting of natural graphite, synthetic graphite, highly oriented pyrolytic graphite, meso-carbon micro-bead, carbon or graphite fiber, carbon or graphitic nano-fiber, partially graphitized pitch, soft carbon, hard carbon, pyrolitic coke, and combinations thereof.

17. The method of claim 1 wherein said liquid medium further contains a monomer or a polymer dissolved or dispersed therein to form a nanocomposite precursor suspension.

18. The method of claim 17 further including a step of converting said suspension to a mat or paper, or converting said nanocomposite precursor suspension to a nanocomposite solid.

19. A method of producing pristine nano graphene platelets, said method comprising:
   a) providing a pristine graphitic material comprising at least a graphite crystallite having at least a graphene plane and an edge surface, wherein said pristine graphitic material is defined as a graphitic material that has never been subjected to intercalation, chemical oxidation, fluorination, solvating or dissolving by a solvent;
   b) dispersing multiple particles of said pristine graphitic material in a surfactant-free liquid medium to produce a suspension, wherein said multiple particles in said liquid have a concentration greater than 0.1 mg/mL and said liquid medium is characterized by having a graphene plane contact angle less than 75 degrees; and
   c) exposing said suspension to direct ultrasonication at a power level greater than 150 watts for a sufficient length of time to produce said nano graphene platelets.

20. The method of claim 19 wherein at least 99% of the pristine graphitic material is converted into nano graphene platelets.

21. The method of claim 19 wherein said contact angle is less than 30 degrees or said nano graphene platelets have an average thickness less than 10 nm.

22. The method of claim 19 wherein said nano graphene platelets have an average thickness less than 1 nm.

23. The method of claim 19 wherein said liquid medium has a surface tension value lower than 30 mN/m.

24. A method of producing nano graphene platelets, said method comprising:
   a) providing a graphitic material selected from the group consisting of meso-carbon micro-bead, carbon or graphite fiber, carbon or graphitic nano-fiber, partially graphitized pitch, soft carbon, hard carbon, pyrolytic coke, and combinations thereof; wherein said graphitic material comprises at least a graphite crystallite having at least a graphene plane and an edge surface and wherein said graphitic material has never been subjected to intercalation, chemical oxidation, fluorination, solvating or dissolving by a solvent;
   b) dispersing multiple particles of said graphitic material in a surfactant-free liquid medium to produce a suspension, wherein said liquid medium is characterized by having a graphene plane contact angle less than 75 degrees; and
   c) exposing said suspension to direct ultrasonication at a sufficient power level for a sufficient length of time to produce said nano graphene platelets.

25. The method of claim 24 wherein said contact angle is less than 45 degrees or said nano graphene platelets have an average thickness less than 20 nm.

26. The method of claim 24 wherein said contact angle is less than 30 degrees or said nano graphene platelets have an average thickness less than 10 nm.

27. The method of claim 24 wherein said nano graphene platelets have an average thickness less than 1 nm.

28. The method of claim 24 wherein said liquid medium has a surface tension value lower than 30 mN/m.

* * * * *